(No Model.)
N. STEPHENS & M. L. RITCHIE.
METHOD OF UTILIZING OLD BOILER TUBES.
No. 319,144. Patented June 2, 1885.
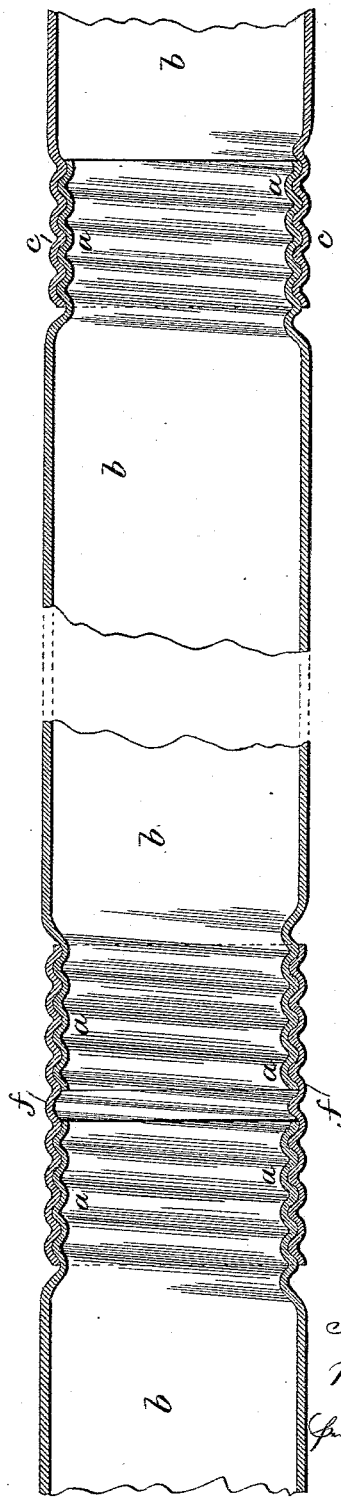
Witnesses
Chas. H. Smith
J. Staib
Inventor
Nathan Stephens
M. L. Ritchie
by Lemuel W. Serrell
atty

UNITED STATES PATENT OFFICE.

NATHAN STEPHENS, OF BROOKLYN, AND MATTHEW L. RITCHIE, OF NEW YORK, ASSIGNORS TO THE EAGLE TUBE COMPANY, OF NEW YORK, N. Y.

METHOD OF UTILIZING OLD BOILER-TUBES.

SPECIFICATION forming part of Letters Patent No. 319,144, dated June 2, 1885.

Application filed November 26, 1884. (No model.)

*To all whom it may concern:*

Be it known that we, NATHAN STEPHENS, of Brooklyn, in the county of Kings and State of New York, and MATTHEW L. RITCHIE, of the city and State of New York, have invented an Improvement in Utilizing Old Boiler-Tubes, of which the following is a specification.

Iron boiler-tubes are of thin metal, and when they are removed from the boiler and others substituted a large percentage of such old tubes are comparatively valueless, as they are too thin to cut upon them the ordinary screw-threads used in gas and water fittings, and they are too soft to withstand the strain usually employed in screwing together ordinary pipes, or in packing joints with lead; hence such old boiler-tubes are not ordinarily merchantable.

Our invention is made with reference to the utilizing of these boiler-tubes and the production of a tube that is especially adapted to ventilator-pipes from water-closets and rooms, for waste or sewer pipes, and for water-leaders for buildings, for water-pipes for irrigation, and other purposes.

In the drawing we have represented our improvement by a sectional view.

The tubes, after they are removed from the boiler, are thoroughly cleaned from scale and foreign matter. The ends of the pipe are cut off true when necessary, and a screw-thread is formed at each end of the tube by bending up such thread in a manner similar to that pursued in the manufacture of sheet-metal screws. Usually the screw $a$ at one end is pressed inwardly, so as to reduce the size of the screw to less than that of the pipe $b$, as seen in the sectional drawing, and at the other end the pipe is enlarged and the screw formed in the same way as at $c$, so that the end $a$ of one pipe will screw into the end $c$ of the other pipe.

If it is desired to maintain the full internal size of the tube, the ends may be swelled before forming the screw-thread thereon.

The metallic pipe may be galvanized or coated with asphalt, varnish, or similar material to prevent rust.

When the lengths of pipe are screwed together, it can be done with facility, and the joint is made tight by red lead or asphalt, or similar material applied to the surfaces before they are screwed together.

This pipe is sufficiently strong to withstand any pressure arising in sewer or waste pipes in buildings, or in the water-leaders. Pipes for these purposes are extensively employed within recesses in the walls of buildings, and our improved pipe occupies much less space than the cast-iron pipes heretofore used. It is more easily applied and less liable to be cracked or injured, and the hubs and leaded joints necessary in cast-iron pipes are dispensed with.

We claim as our invention—

The method herein specified of utilizing old iron boiler-tubes, consisting in cleaning the surface, bending sheet-metal screws at each end, and coating the same with a protecting material, substantially as specified.

Signed by us this 24th day of November, A. D. 1884.

NATHAN STEPHENS.
M. L. RITCHIE.

Witnesses:
GEO. T. PINCKNEY,
WILLIAM G. MOTT.